(12) United States Patent
Lin

(10) Patent No.: US 8,646,330 B2
(45) Date of Patent: Feb. 11, 2014

(54) BICYCLE WHEEL BALANCE MACHINE

(76) Inventor: Chang Hui Lin, Chang Hua Hsien (TW)

( * ) Notice: Subject to any disclaimer, the term of this patent is extended or adjusted under 35 U.S.C. 154(b) by 243 days.

(21) Appl. No.: 13/135,648

(22) Filed: Jul. 12, 2011

(65) Prior Publication Data
US 2013/0014580 A1 Jan. 17, 2013

(51) Int. Cl.
*G01M 1/16* (2006.01)
*G01M 1/28* (2006.01)

(52) U.S. Cl.
USPC .............................................. 73/462; 73/457

(58) Field of Classification Search
USPC .............. 73/460, 462, 468, 457, 146; 33/203, 33/203.12, 203.13, 203.16
See application file for complete search history.

(56) References Cited

U.S. PATENT DOCUMENTS

| | | | |
|---|---|---|---|
| 3,461,729 A * | 8/1969 | Haynes | 73/457 |
| 3,862,570 A * | 1/1975 | Ongaro | 73/146 |
| 3,948,106 A * | 4/1976 | Armbruster | 73/457 |
| 4,014,139 A | 3/1977 | Shooter et al. | |
| 4,045,852 A * | 9/1977 | Winch | 29/894.33 |
| 4,126,942 A * | 11/1978 | Damman | 33/203.12 |
| 4,193,305 A | 3/1980 | Hunter | |
| 4,324,139 A * | 4/1982 | Muhlau | 73/457 |
| 4,417,237 A * | 11/1983 | Korth | 33/203.16 |
| 5,103,414 A * | 4/1992 | Papadopoulos | 33/203.16 |
| 5,383,361 A | 1/1995 | Matumoto | |
| 5,773,719 A * | 6/1998 | Ferrari et al. | 73/487 |
| 6,752,016 B2 * | 6/2004 | Rothamel | 73/462 |

* cited by examiner

*Primary Examiner* — Helen Kwok
(74) *Attorney, Agent, or Firm* — Charles E. Baxley

(57) ABSTRACT

A bicycle wheel balance machine includes a base having two spaced arms for engaging with a bicycle wheel, a casing slidably engaged in one of the arms and having a center member movable to engage with a wheel hub with an anchoring device, a spindle rotatably engaged in the other arm and engaged with the wheel hub, a motor coupled to the spindle for rotating the spindle and the bicycle wheel, two sensors attached to the arms for sensing conditions of the bicycle wheel, and the bicycle wheel balance machine includes a simplified structure to be easily operated by the users themselves at home.

3 Claims, 7 Drawing Sheets

BICYCLE WHEEL BALANCE MACHINE

BACKGROUND OF THE INVENTION

1. Field of the Invention

The present invention relates to a bicycle wheel and tire balance testing machine, and more particularly to a bicycle wheel and tire balance testing machine including a simplified structure for allowing the bicycle wheel and tire balance testing machine to be easily and readily operated and actuated by the users themselves and for allowing the users to test and balance the bicycle wheel and tire by themselves at home.

2. Description of the Prior Art

Typical vehicle wheel balance machines comprise a huge machine body or housing and a number of parts or elements to be disposed or engaged into the huge machine body or housing for balancing and testing the vehicle wheels and tires, but may not be used for balancing and testing or measuring or truing the bicycle wheels.

For example, U.S. Pat. No. 4,014,139 to Shooter et al., U.S. Pat. No. 4,193,305 to Hunter, and U.S. Pat. No. 5,383,361 to Matumoto disclose several of the typical vehicle wheel and tire balancing and testing or measuring or truing machines each comprising a number of mechanical parts or elements disposed or engaged into a huge machine body or housing for supporting and carrying the vehicle wheels and tires, and a number of electrical parts or elements also disposed or engaged into the huge machine body or housing for balancing and testing or measuring or truing the vehicle wheels and tires.

However, the machine body or housing includes a huge volume that may not be easily disposed into the house families, and includes a number of mechanical parts or elements and a number of electrical parts or elements that may greatly increase the fees or costs for the typical vehicle wheel and tire balancing and testing or measuring or truing machines, such that the typical vehicle wheel and tire balancing and testing or measuring or truing machines may not be easily and readily operated and actuated by the users themselves at home. In addition, the typical vehicle wheel and tire balancing and testing or measuring or truing machines are developed and provided and used for balancing and testing or measuring or truing the large vehicle wheels, but may not be provided and used for balancing and testing or measuring or truing the bicycle wheels.

The present invention has arisen to mitigate and/or obviate the afore-described disadvantages of the conventional bicycle wheel balance machines.

SUMMARY OF THE INVENTION

The primary objective of the present invention is to provide a bicycle wheel balance machine including a simplified structure for allowing the bicycle wheel and tire balance testing machine to be easily and readily operated and actuated by the users themselves and for allowing the users to test and balance the bicycle wheel and tire by themselves at home.

In accordance with one aspect of the invention, there is provided a bicycle wheel balance machine comprising a supporting base including a first arm and a second arm extended therefrom and spaced from each other for forming a space between the first and the second arms, the first and the second arms each including a chamber formed therein, a bicycle wheel rotatably received and engaged in the space and located between the arms, and including a wheel rim, and a wheel hub, and a plurality of wheel spokes mounted between the wheel rim and the wheel hub, a casing slidably engaged in the chamber of the first arm and including a center member extended therefrom for engaging with the wheel hub, an anchoring device attached to the first arm and engaged with the casing for moving the center member of the casing to engage with the wheel hub, a spindle rotatably engaged in the chamber of the second arm and engaged with the wheel hub, a motor coupled to the spindle with a connecting device for rotating the spindle and the bicycle wheel, a first sensor attached to the first arm for sensing conditions of the bicycle wheel, and a second sensor attached to the second arm for sensing conditions of the bicycle wheel, the bicycle wheel balance machine includes a simplified structure for allowing the bicycle wheel and tire balance testing machine to be easily and readily operated and actuated by the users themselves and for allowing the users to test and balance the bicycle wheel and tire by themselves at home.

The first arm includes an engaging member attached to the center member of the casing and engaged with the wheel hub. The first arm includes a cylindrical member rotatably engaged in the casing and secured to the engaging member with an anchoring member. The first arm includes a third sensor attached to the anchoring member.

The second arm includes an engaging member attached to the spindle and engaged with the wheel hub. The second arm includes a barrel rotatably engaged in the chamber of the second arm and secured to the engaging member with an anchoring member. The second arm includes a third sensor attached to the anchoring member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
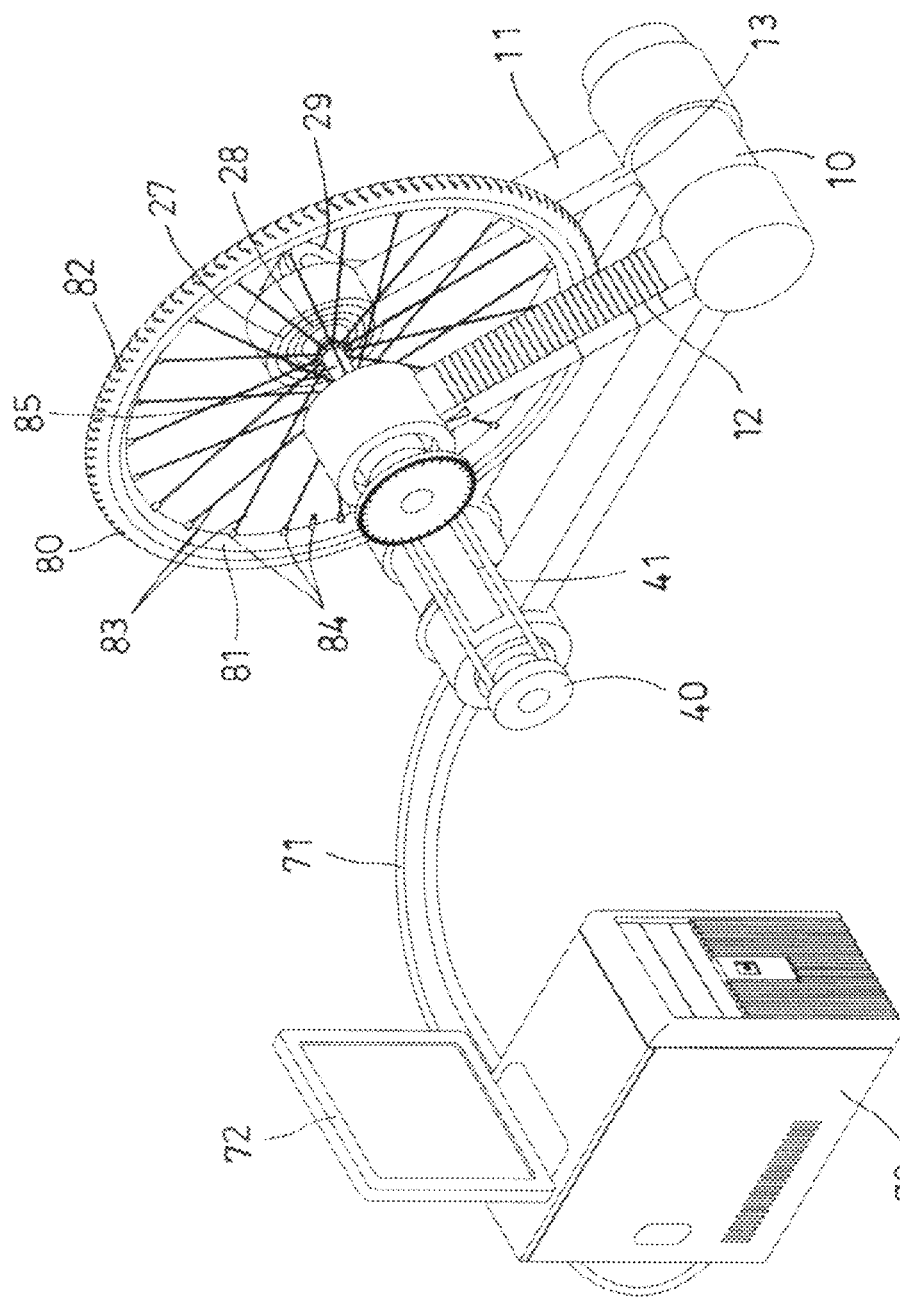
FIG. 1 is a perspective view of a bicycle wheel balance machine in accordance with the present invention.
Figure 2:
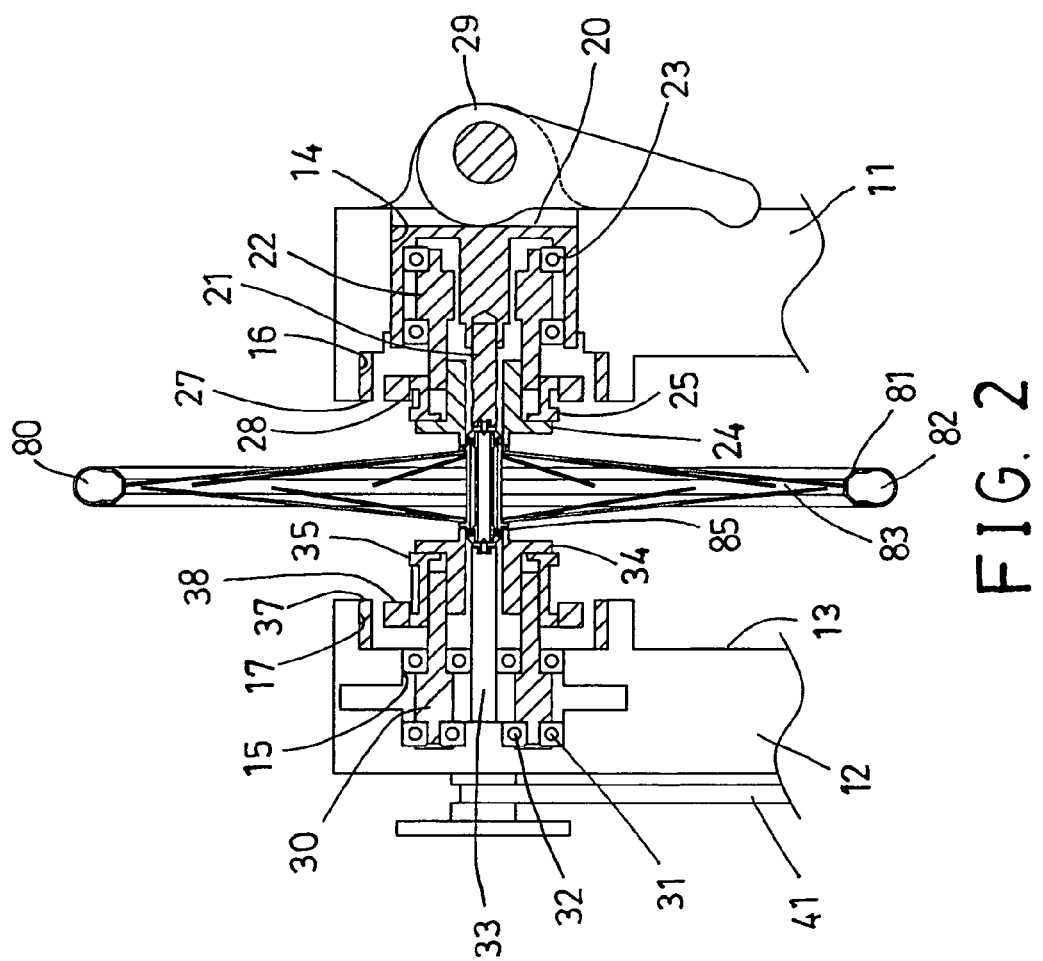
FIG. 2 is an enlarged partial cross sectional view of the bicycle wheel balance machine.

Referring to the drawings, and initially to FIGS. 1 and 2, a bicycle wheel balance machine in accordance with the present invention comprises a supporting base 10 including two arms 11, 12 extended upwardly therefrom and tilted or inclined relative to the supporting base 10 and spaced from each other for forming or defining a gap or space 13 between the arms 11, 12 and for pivotally or rotatably receiving or engaging with a bicycle wheel 80 to be balanced and tested or measured or trued with the bicycle wheel balance machine.

Figure 3:
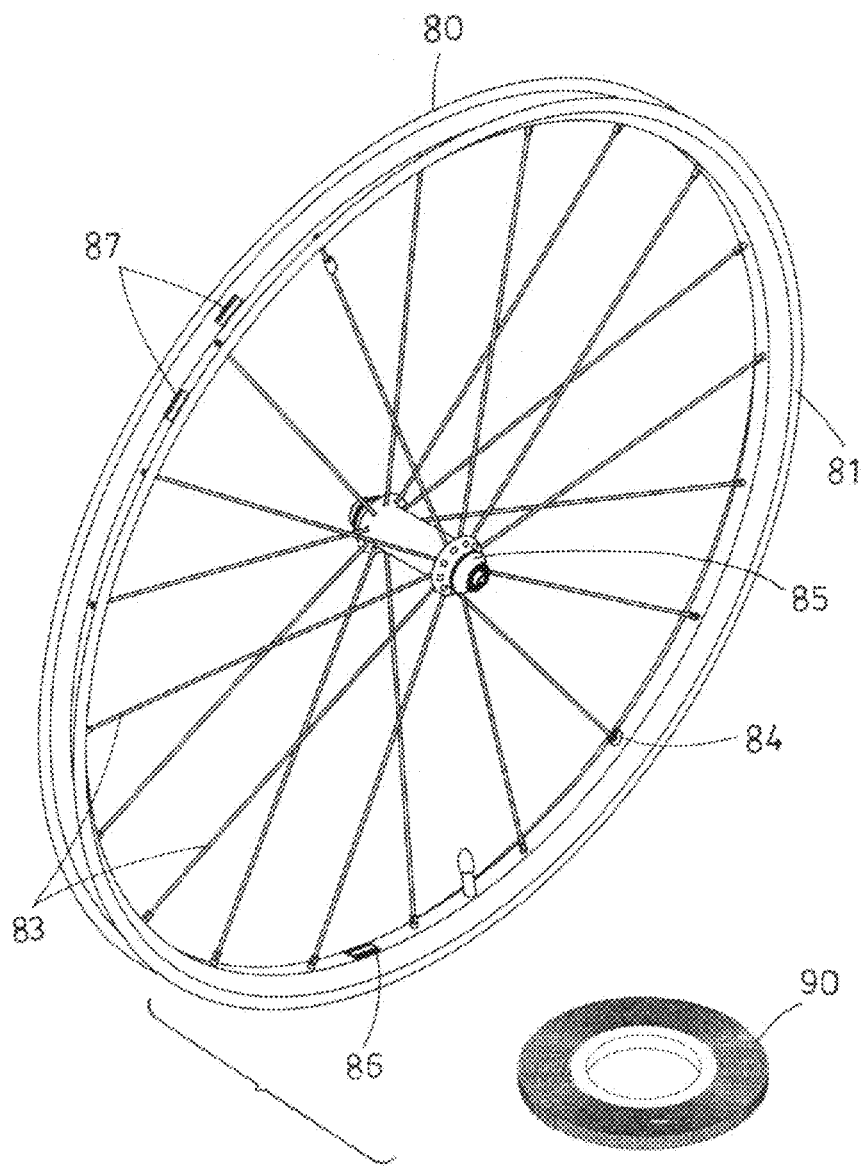
FIG. 3 is a partial exploded view illustrating the wheel rim and the weight members for being operated with the bicycle wheel balance machine.

The bicycle wheel 80 includes a wheel rim 81, an inner tire and/or an outer tire 82 disposed or attached or mounted or secured or engaged onto the wheel rim 81, a number of wheel spokes 83 disposed or engaged into the wheel rim 81 and attached or mounted or secured to the wheel rim 81 with spoke positioning pockets or attachment members 84, and a wheel hub 85 attached or mounted or secured to the middle or center portion of the wheel spokes 83. As shown in FIG. 3, a weight member 90 is to be attached or mounted or secured onto the outer tire 82 and/or the spoke positioning pockets or attachment members 84 and/or the inner peripheral portion 86 and/or the outer peripheral portion 87 of the wheel rim 81 for weight balancing and truing purposes.

As shown in FIG. 2, the arms 11, 12 each include a chamber 14, 15 and an enlarged inner peripheral recess 16, 17 formed therein, such as formed in the free end portion thereof, and the chambers 14, 15 and the peripheral recesses 16, 17 of the arms 11, 12 are preferably aligned with each other. A casing 20 is slidably received or engaged in the chamber 14 of the arm 11 and includes a center member 21 extended outwardly therefrom for engaging with the wheel hub 85 and for supporting and carrying or attaching or mounting the bicycle wheel 80 to the supporting base 10. An actuating or fastening or actuating or anchoring device 29, such as a quick release device 29 is attached or mounted to the arm 11 and engaged with the casing 20 for moving or forcing or clamping or actuating the center member 21 of the casing 20 to solidly engage with the wheel hub 85.

A sleeve or cylindrical member 22 is rotatably received or engaged in the casing 20 with joints or bearing members 23, and an engaging member 24 and a chuck or attaching or anchoring member 25 are attached or mounted or secured to the free or inner end portion of the cylindrical member 22 and/or the center member 21 of the casing 20 for engaging with the wheel hub 85 and for solidly and stably anchoring or positioning and securing or retaining the bicycle wheel 80 to the supporting base 10 and for allowing the bicycle wheel 80 to be rotated in concert with the cylindrical member 22 and/or the engaging member 24 and/or the anchoring member 25.

A fixed or stationary detector or sensor 27 is disposed or engaged into the inner peripheral recess 16 of the arm 11, and another detector or sensor 28 is attached or mounted or secured to the cylindrical member 22 or the engaging member 24 and/or the anchoring member 25 and rotated in concert with the cylindrical member 22 and/or the engaging member 24 and/or the anchoring member 25 and/or the bicycle wheel 80 for detecting or sensing various conditions of the bicycle wheel 80.

A sleeve or barrel 30 is rotatably received or engaged in the chamber 15 of the arm 12 with joints or bearing members 31, and a spindle 33 is also rotatably received or engaged in the chamber 15 of the arm 12 and rotatably received or engaged in the barrel 30 with joints or bearing members 32, the spindle 33 is also engaged with the wheel hub 85 and rotated in concert with the bicycle wheel 80. A motor 40 is connected or coupled to the spindle 33 with a connecting or coupling chain or belt or device 41 for rotating or driving the spindle 33 and the bicycle wheel 80.

An engaging member 34 and a chuck or attaching or anchoring member 35 are attached or mounted or secured to the spindle 33 and/or the free or inner end portion of the barrel 30 for engaging with the wheel hub 85 and for solidly and stably anchored or positioned and secured or retained the bicycle wheel 80 to the supporting base 10 and for allowing the bicycle wheel 80 to be rotated in concert with the barrel 30 and the spindle 33 and thus for allowing the bicycle wheel 80 to be solidly and stably anchored or positioned and secured or retained between the spindle 33 and the center member 21 of the casing 20.

Another fixed or stationary detector or sensor 37 is disposed or engaged into the inner peripheral recess 17 of the other arm 12, and a further detector or sensor 38 is attached or mounted or secured to the barrel 30 or the engaging member 34 and/or the anchoring member 35 and rotated in concert with the barrel 30 and/or the engaging member 34 and/or the anchoring member 35 and/or the bicycle wheel 80 for detecting or sensing various conditions of the bicycle wheel 80. The detectors or sensors 27, 28, 37, 38 are electrically connected or coupled to a computer or processing device 70 with electric wires or cables 71 (FIG. 1) for sending the detected or sensed data or information to the computer or processing device 70 which includes a monitor or displayer device 72 for showing or displaying the data or information.

Figure 4:
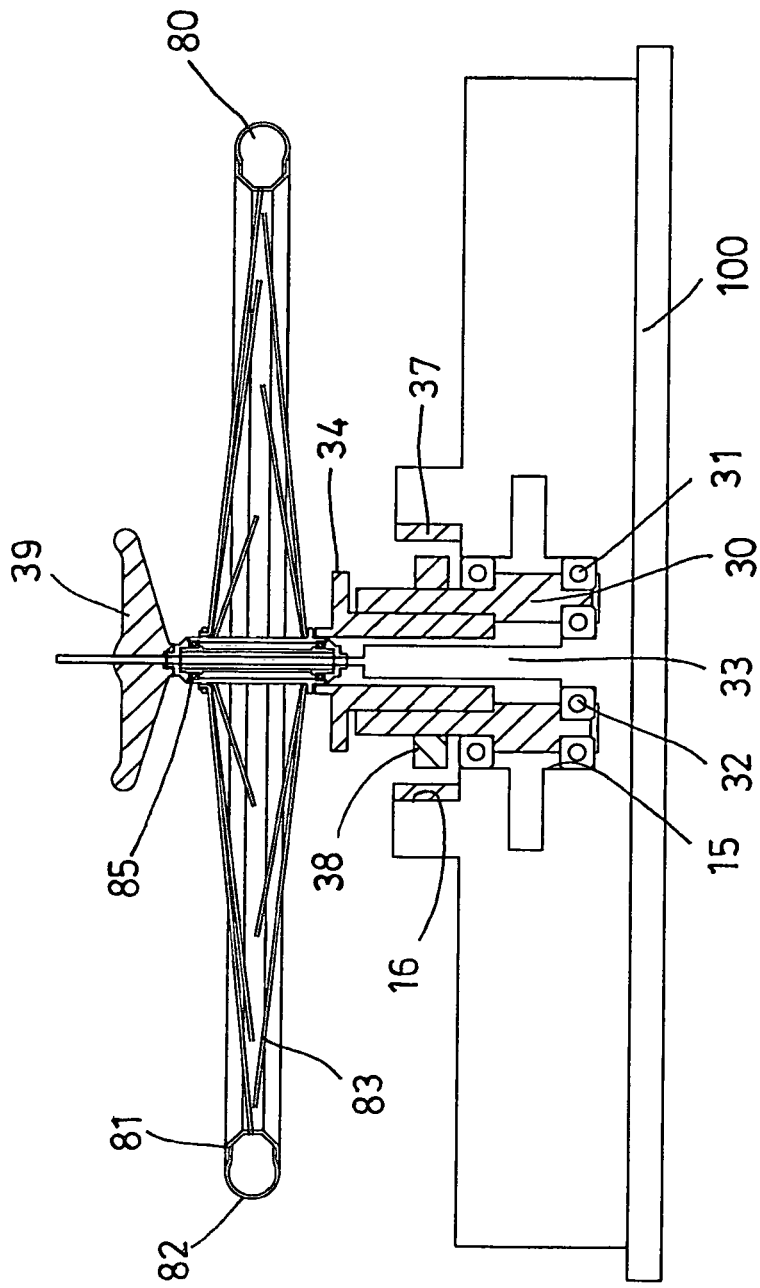
FIG. 4 is a partial cross sectional view illustrating the other arrangement of the bicycle wheel balance machine.

Alternatively, as shown in FIG. 4, the supporting base 100 may include a chamber 15 and an enlarged inner peripheral recess 16 formed therein, such as formed in the upper portion thereof, and a barrel 30 is rotatably received or engaged in the chamber 15 of the supporting base 100 with joints or bearing members 31, and a spindle 33 is also rotatably received or engaged in the chamber 15 of the supporting base 100 and rotatably received or engaged in the barrel 30 with joints or bearing members 32, the spindle 33 is also engaged with the wheel hub 85 and rotated in concert with the bicycle wheel 80.

An actuating or fastening or actuating or anchoring device 39, such as a threaded fastening device 39 is attached or mounted to the spindle 33 and engaged with the bicycle wheel 80 for solidly and stably anchoring or positioning and securing or retaining the bicycle wheel 80 to the spindle 33 and for allowing the bicycle wheel 80 to be rotated in concert with the spindle 33. An engaging member 34 is attached or mounted or secured to the free or inner end portion of the barrel 30 for engaging with the wheel hub 85 and for solidly and stably anchored or positioned and secured or retained the bicycle wheel 80 to the spindle 33. Another fixed or stationary detector or sensor 37 is disposed or engaged into the inner peripheral recess 16 of the supporting base 100, and a further detector or sensor 38 is attached or mounted or secured to the barrel 30 or the engaging member 34 and rotated in concert with the barrel 30 and/or the engaging member 34 and/or the bicycle wheel 80 for detecting or sensing various conditions of the bicycle wheel 80.

Figure 5:
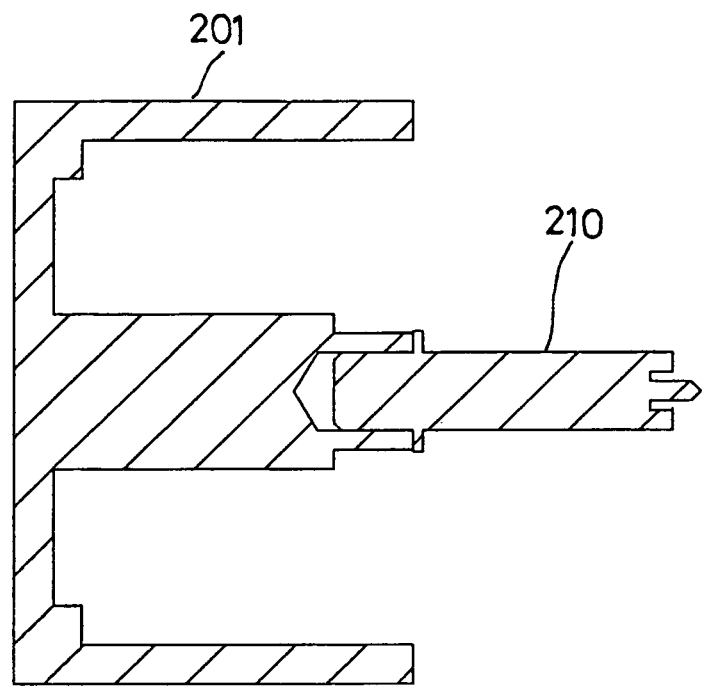
FIG. 5 is another partial cross sectional view illustrating the further arrangement of the bicycle wheel balance machine.
Figure 6:
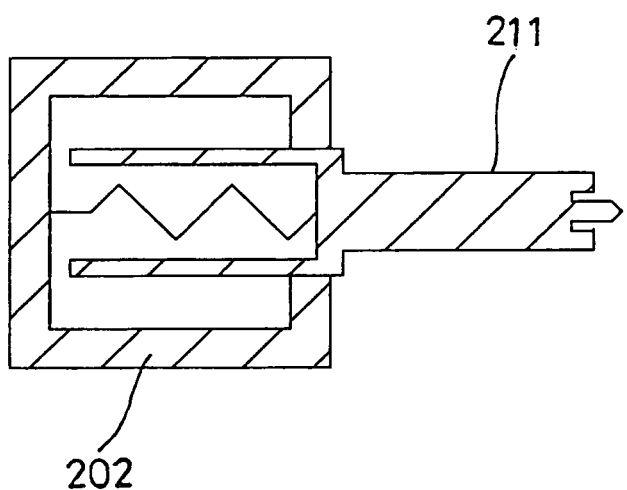
FIG. 6 is a further partial cross sectional view illustrating the further arrangement of the bicycle wheel balance machine.
Figure 7:
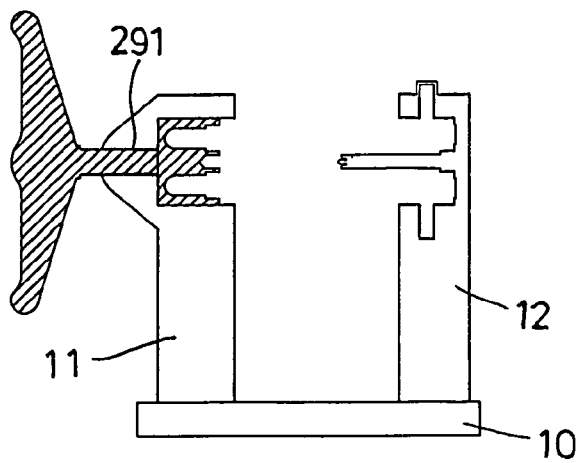
FIG. 7 is a still further partial cross sectional view illustrating the further arrangement of the bicycle wheel balance machine.
Figure 8:
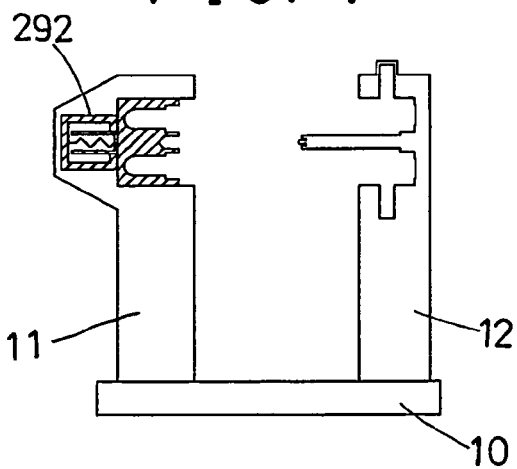
FIG. 8 is a still further partial cross sectional view illustrating the further arrangement of the bicycle wheel balance machine.
Figure 9:
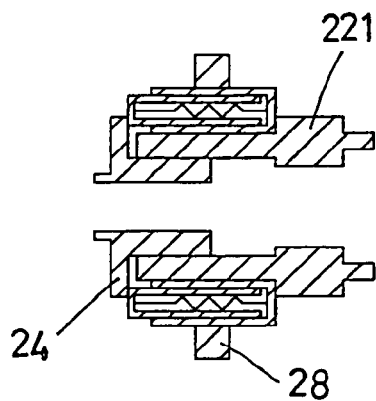
FIG. 9 is a still further partial cross sectional view illustrating the further arrangement of the bicycle wheel balance machine.

Further alternatively, as shown in FIG. 5, the center member 210 of the casing 201 may be a separately manufactured piece for attaching to the casing 201 in order to solidly engage with the wheel hub 85; or as shown in FIG. 6, the center member 211 of the casing 202 may include a slidable structure for being slidably received or engaged in the casing 202. As shown in FIG. 7, the actuating or fastening or actuating or anchoring device 291 may be selected from a threaded fastening device 291 attached or mounted to the arm 11, or, as shown in FIG. 8, may be selected from a slidable structure for being slidably received or engaged in the arm 11. As shown in FIG. 9, the cylindrical member 221 may also be selected from a slidable structure.

Figure 10:
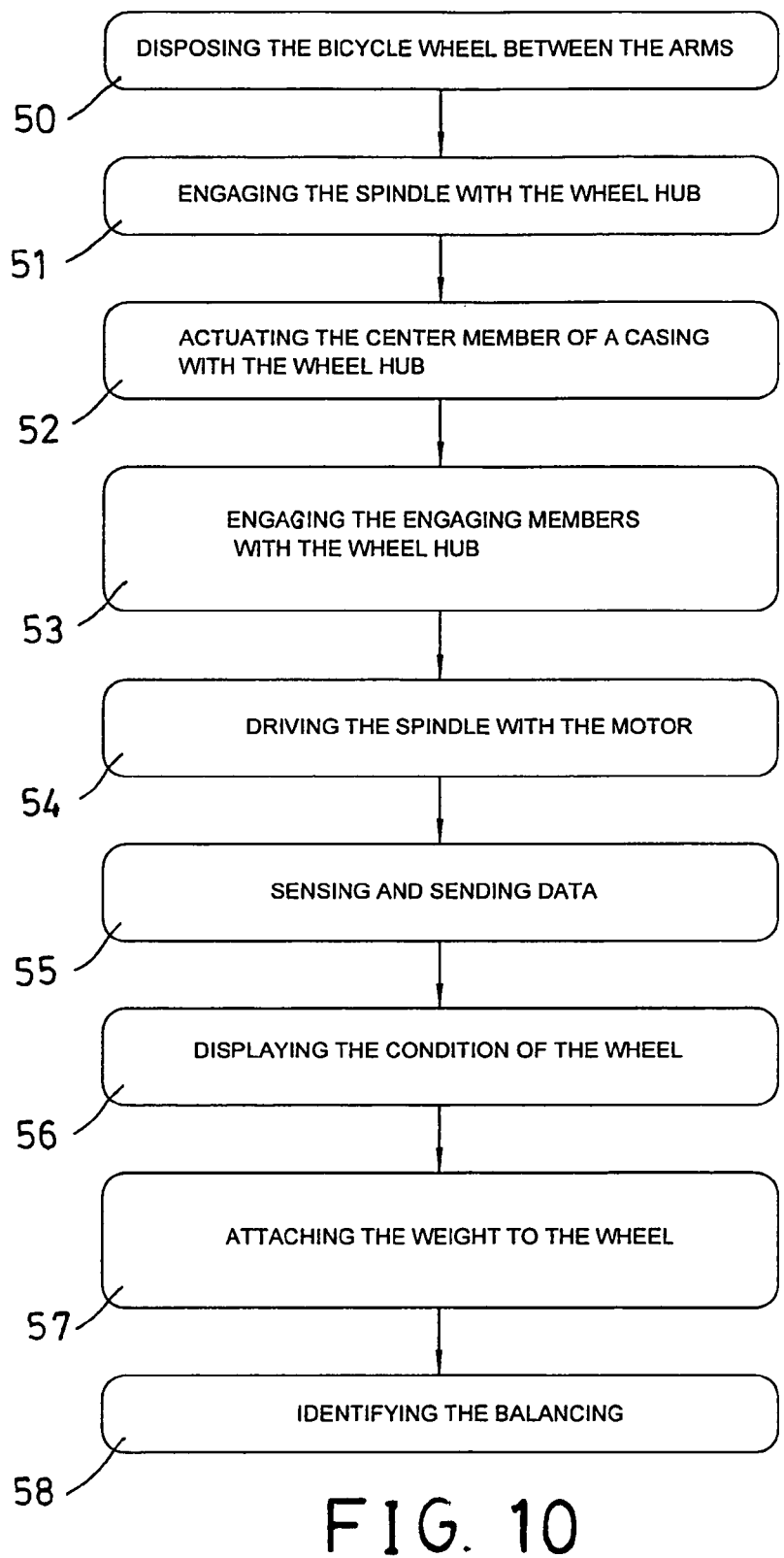
FIG. 10 is a block diagram illustrating the operating procedures of the bicycle wheel balance machine.

In operation, as shown in FIG. 10, the bicycle wheel 80 is first disposed in the supporting base 10 and between the arms 11, 12 in the process 50, the spindle 33 and the center member 21 of the casing 20 are then engaged with the wheel hub 85 in the process 51, the anchoring device 29 is then actuated to move and force the center member 21 of the casing 20 to solidly engage with the wheel hub 85 in the process 52, the engaging members 24, 34 are then engaged with the wheel hub 85 in the process 53, the spindle 33 and the center member 21 of the casing 20 and the bicycle wheel 80 are then rotated or driven by the motor 40 in the process 54, the sensors 27, 28, 37, 38 are actuated to detect and sense the condition of the bicycle wheel 80 and send the detected data or information to the processing device 70 in the process 55, the condition of the bicycle wheel 80 is shown in the monitor or displayer device 72 in the process 56.

In one condition, the weight member 90 may be attached or mounted or secured onto the wheel rim 81 and/or the wheel spokes 83 and/or the spoke positioning pockets or attachment members 84 for weight balancing and truing purposes in the process 57, and the balance of the bicycle wheel 80 is thus identified in the process 58. Alternatively, or in the other condition, some of the portions of the wheel rim 81 may be cut off or drilled to reduce and to adjust the weight distribution of the wheel rim 81 and for weight balancing and truing purposes. An additional centering machine (not shown), and/or a circularity detecting machine (not shown) for the wheel rim 81, and/or a spoke tension testing machine (not shown) may further be provided and electrically connected or coupled to the computer or processing device 70.

It is to be noted that the bicycle wheel balance machine includes a simplified structure having a supporting base 10 and two arms 11, 12 for supporting and carrying or attaching or mounting the bicycle wheel 80, and various conditions of the bicycle wheel 80 may be easily and quickly and readily detected or sensed and obtained with the detectors or sensors 27, 28, 37, 38, and then displayed or shown in the monitor or displayer device 72, and the user or operator may then attach or mount or secure the weight member 90 onto the wheel rim 81 and/or the wheel spokes 83 and/or the spoke positioning pockets or attachment members 84 for weight balancing and truing purposes, such that the bicycle wheel and tire balance testing machine may be easily and readily operated and actuated by the users themselves at home.

Accordingly, the bicycle wheel balance machine in accordance with the present invention includes a simplified structure for allowing the bicycle wheel and tire balance testing machine to be easily and readily operated and actuated by the users themselves and for allowing the users to test and balance the bicycle wheel and tire by themselves at home.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle wheel balance machine comprising:
    a supporting base including a first arm and a second arm extended therefrom and spaced from each other for forming a space between said first and said second arms, said first and said second arms each including a chamber formed therein,
    a bicycle wheel rotatably received and engaged in said space and located between said arms, and including a wheel rim, and a wheel hub, and a plurality of wheel spokes mounted between said wheel rim and said wheel hub,
    a casing slidably engaged in said chamber of said first arm and including a center member extended therefrom for engaging with said wheel hub,
    a cylindrical member rotatably engaged in said casing,
    a first anchoring member attached to said cylindrical member of said casing,
    a first engaging member attached to said anchoring member and engaged with said wheel hub,
    an anchoring device attached to said first arm and engaged with said casing for moving said center member of said casing to engage with said wheel hub,
    a barrel rotatably engaged in said chamber of said second arm,
    a second engaging member and a second anchoring member attached to said barrel of said second arm and engaged with said wheel hub,
    a spindle rotatably engaged in said chamber of said second arm and engaged with said wheel hub,
    a motor coupled to said spindle with a connecting device for rotating said spindle and said bicycle wheel,
    a first sensor attached to said first arm for sensing conditions of said bicycle wheel, and
    a second sensor attached to said second arm for sensing conditions of said bicycle wheel.

2. The bicycle wheel balance machine as claimed in claim 1, wherein said first arm includes a third sensor attached to said first anchoring member.

3. The bicycle wheel balance machine as claimed in claim 1, wherein said second arm includes a third sensor attached to said second anchoring member.

* * * * *